United States Patent Office 3,655,827
Patented Apr. 11, 1972

3,655,827
POLYCHLOROPRENE SOL-GEL BLENDS
Joseph B. Finlay and John F. Hagman, Wilmington, Del.,
assignors to E. I. du Pont de Nemours and Company,
Wilmington, Del.
No Drawing. Filed Feb. 28, 1969, Ser. No. 803,470
Int. Cl. C08d 9/16
U.S. Cl. 260—890                                        6 Claims

ABSTRACT OF THE DISCLOSURE

Novel polychloroprene sol-gel elastomer blends, curable to elastomeric vulcanizates having improved tensile strength, are intimate mixtures of (a) a dialkyl xanthogen disulfide-modified, benzene-soluble polymer of chloroprene, the amount of dialkyl xanthogen disulfide being equivalent to about from 0.15 to 1 part of diethyl xanthogen disulfide per 100 parts of chloroprene monomer and the alkyl group having from 1 to 8 carbon atoms, and (b) a benzene-insoluble polymer of chloroprene, the proportion by weight of (a) to (b) being in the range from 20:1 to 1:1.

BACKGROUND OF THE INVENTION

An economical method of processing rubbery materials is by extrusion under high pressure through an orifice of the desired shape. In such a process the elastomeric material must be capable of (1) being extruded at a high rate and (2) retaining its extruded shape with good definition until vulcanization has been accomplished. Elastomers having these desirable characteristics have been called "easily processable" elastomers. Such easily processable chloroprene elastomers can be obtained by intimately blending a benzene-soluble ("sol") chloroprene polymer with a benzene-insoluble, cross-linked ("gel") chloroprene polymer, as disclosed, for example, in U.S. Pats. 3,042,652; 3,147,317; and 3,147,318.

Blends of sol and gel chloroprene polymers have heretofore suffered from the disadvantage of yielding vulcanizates of lower tensile strengths than those of vulcanizates obtained from the sol chloroprene polymers alone, and it has not been apparent how this deficiency could be corrected.

Dialkyl xanthogen disulfides have already been used as modifying or chain-transfer agents in individual chloroprene polymers—see, for example, U.S. Pats. 2,321,693 and 2,567,117. In the latter patent the dialkyl xanthogen disulfides are called "dialkyl dithiobis(thionoformates)." It has not been apparent or suggested, however, that any advantage was to be gained by use of dialkyl xanthogen disulfide-modified chloroprenes in sol-gel polychloroprene blends as compared with sol-gel blends of polychloroprenes not so modified.

SUMMARY

Now according to the present invention it has been found that vulcanizates of blends of sol and gel chloroprene polymers having excellent tensile strengths can be obtained when the sol component of the blend has been prepared in the presence of a dialkyl xanthogen disulfide. For convenience, polymers so prepared are referred to hereinafter as "xanthogen-modified" polymers.

More particularly the invention is concerned with compositions comprising an intimate mixture of (a) a benzene-soluble polymer of chloroprene prepared in the presence of, i.e. in contact with, a dialkyl xanthogen disulfide in an amount equivalent to about 0.15 to 1 part of diethyl xanthogen disulfide per 100 parts of monomer, the alkyl group having from 1 to 8 carbon atoms, and (b) a benzene-insoluble polymer of chloroprene, in which mixture the proportion by weight of (a) to (b) ranges from 20:1 to 1:1.

The invention is also concerned with processes for preparing the compositions, processes for curing them, and the cured vulcanizates of improved tensile strength so produced.

DESCRIPTION OF THE PREFERRED EMBODIMENTS (a) The benzene-soluble chloroprene polymer The sol polychloroprene component of the present compositions can be prepared by processes with which the art is already familiar and which are described, for instance, in the above-mentioned U.S. Pats. 3,042,652; 3,147,317 and 3,147,318.

The dialkyl xanthogen disulfides used for modifying the sol polychloroprene can be represented by the structure:

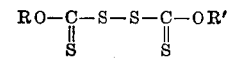

wherein R and R' are alkyl radicals having one to eight carbon atoms. Examples of suitable alkyl radicals are methyl, ethyl, propyl, isopropyl, and the various isomeric butyl, amyl, hexyl, heptyl, and octyl radicals. The preferred dialkyl xanthogen disulfides are those in which each alkyl radical has 1 to 4 carbon atoms.

The amounts of particular dialkyl xanthogen disulfides used will vary somewhat with the molecular weight of the compound. However, for unknown reasons, there are small differences in modifying effectiveness among molecularly equivalent amounts of various dialkyl xanthogen disulfides. For this reason, the amount of dialkyl xanthogen disulfide is defined herein in terms of the effective amount of diethyl xanthogen disulfide, which effective amount ranges from about 0.15 to about 1 part per 100 parts of monomer. To determine the equivalent amounts of another dialkyl xanthogen disulfide, one may, for example, plot the Mooney viscosities of polymers prepared in the presence of varying amounts of the other dialkyl xanthogen disulfide and compare it with a similar plot prepared using varying amounts of diethyl xanthogen disulfide. The amounts of diethyl xanthogen disulfide called for (0.15 to 1 part per 100 parts of monomer) are those amounts which yield benzene-soluble chloroprene polymers having Mooney viscosities within a practical range. The preferred range of diethyl xanthogen disulfide is from 0.3 to 0.6 part.

The polymerization is carried out in aqueous emulsion using a free-radical polymerization catalyst such as an alkali metal persulfate.

Any of the conventional emulsifying agents can be used in preparing the monomer emulsion. These include the water-soluble salts, particularly the sodium or potassium salts, of compounds of the following types: longchain fatty acids; rosins or rosin derivatives, such as wood rosin, tall oil rosin, disproportionated rosins, or partially polymerized rosin; higher alcohol sulfates, and arylsulfonic acids such as alkylbenzenesulfonic acids and the condensation product of formaldehyde with a naphthalenesulfonic acid.

The concentration of organic monomer present in the starting emulsion is not critical. In general, 30 to 60 percent by weight, based on the total weight of the emulsion is the range of concentrations of organic monomer used in the preparation of the polymer.

It is preferred that the pH be in the alkaline range.

The polymerization may be carried out between 0° C. and 80° C., preferably between 30° and 50° C.

Polymerization is stopped at a monomer conversion at which benzene-soluble polymer is obtained. The desirable point at which to stop polymerization will depend somewhat on the amount of alkyl xanthogen disulfide used, but, in general, will range from about 50% to about 70% conversion. Polymerization is stopped by use of conventional "short-stopping" agents such as are disclosed in U.S. Pat. 2,576,009. Unreacted monomer is removed by known methods, such as by steam stripping as disclosed in U.S. Pat. 2,467,769.

It is to be understood that up to 50% of the chloroprene can be replaced by another copolymerizable monomer. Examples of suitable comonomers are:

Vinyl aromatic compounds, such as styrene, the vinyl toluenes, and vinylnaphthalenes;

Aliphatic conjugated diolefin compounds such as 1,3-butadiene; isoprene; 2,3-dimethyl-1,3-butadiene; and 2,3-dichloro-1,3-butadiene.

Vinyl ethers, esters, and ketones, such as methyl vinyl ether, vinyl acetate, and methyl vinyl ketone;

Esters, amides, and nitriles of acrylic and methacrylic acids, such as ethyl acrylate, methyl methacrylate, methacrylamide, and acrylonitrile.

(b) Benzene-insoluble chloroprene polymer

The benzene-insoluble component or "gel" chloroprene polymer can be prepared by any method which will yield a cross-linked polymer in latex form. For example, the chloroprene can be polymerized to a high conversion in the absence of or with relatively small amounts of chain-transfer agents such as the alkyl mercaptans or the dialkyl xanthogen disulfides. A suitable method of carrying out such a high-conversion process is disclosed, for example, in U.S. Pat. 3,147,317. Another method of inducing formation of a cross-linked chloroprene polymer is to have present in the polymerization system a monomer which will copolymerize with the chloroprene and which contains two or more polymerizable double bonds. Examples of such suitable monomers include divinylbenzene and esters of methacrylic acid with poly hydroxy compounds such as the alkylene glycols, dihydroxybenzene, or trimethylolpropane.

These polymerizations are, in general, carried out using the same general techniques as are used in polymerizing the benzene-soluble chloroprene polymer except that the monomer conversion may be allowed to proceed to a greater extent, such as 90–100%.

Another method of preparing cross-linked chloroprene polymers suitable for use in practicing this invention is by after-treatment of the latex in such a way as to cross-link the polymer contained therein. Examples of suitable methods are by radiation treatment as disclosed in U.S. Pat. 3,042,652 and treatment with an organic peroxy compound as disclosed in U.S. Pat. 3,147,318. Other methods will be within the scope of those skilled in the art.

In the preparation of the cross-linked component, part of the chloroprene, up to about 20%, may be replaced with another monomer of the same type listed above in describing the preparation of the benzene-soluble component.

(c) Preparation of the mixture of benzene-soluble and benzene-insoluble chloroprene polymers The blending of the components of the elastomeric composition is conveniently carried out by thoroughly mixing the latices and then isolating the polymer mixture by conventional methods such as by coagulation by freezing (as described in U.S. Pat. 2,187,146) or by drum drying (as described in U.S. Pat. 2,914,497). It is also possible first to isolate the individual components by conventional methods and then to mix the isolated polymers by mechanical means, such as by milling or by working in an internal mixer such as a Banbury or Werner-Pfleiderer mill.

The proportion of benzene-soluble component (a) to cross-linked component (b) may range from about 20:1 to about 1:1. At least half of mixture should consist of the xanthogen-modified benzene-soluble component (a) in order to have the desirable tensile properties. At least 4.7 percent of the mixture should be the cross-linked component in order for the composition to have the desirable easy-processing properties of such sol-gel blends. The preferred proportion of benzene-soluble polymer to cross-linked (gel) polymer are 1:1 to 4:1.

(d) Use of the compositions of this invention

The elastomeric compositions of this invention can be compounded and cured in the same way as the conventional chloroprene polymers, as described in chapters II and III of "The Neoprenes" by R. M. Murray and D.C. Thompson, published by E. I. du Pont de Nemours and Co. in 1963. However, optimum tensile strengths are obtained when certain curing agents are used. Particularly effective are 1,4-diazabicyclo[2.2.2]octan (triethylenediamine) and a mixture of ethanolamine and di-o-tolylguanidine. The use of these curing agents is illustrated in the examples. Other curing agents that can be used are:

(a) Tetrahydro-3,5 - dimethyl-2H - 1,3,5-thiadiazine-2-thione,
(b) Mixtures of 2-mercapto-2-imidazoline and tetramethyl thiuram disulfide,
(c) Dimethylethanolamine and its aromatic polyisocyanate adducts, and
(d) Mixtures of di-o-tolylguanidine, tetramethyl thiuram monosulfide and sulfur.

The compositions of this invention are useful in areas where conventional dry-type neoprene polymers have found application. Examples of articles which can advantageously be prepared from the elastomeric compositions include wire coatings, hoses, extruded sponge and other products, calendered sheets, and automotive window channels.

The invention will be better understood by reference to the following illustrative examples.

EXAMPLE 1

(A) Preparation of polymers and polymer mixtures

Two sol chloroprene polymers are prepared having equivalent Mooney viscosities. One of these is prepared in the presence of diethyl xanthogen disulfide and the other in the presence of technical dodecyl mercaptan (a mixture of primary aliphatic mercaptans consisting predominantly of 1-dodecanethiol; a typical composition is: 1-decanethiol, 3%; 1-dodecanethiol, 61%; 1-tetradecanethiol, 23%; 1 hexadecanethiol, 11%; 1-octadecanethiol, 2%). Also two gel copolymers of chloroprene and ethylene dimethacrylate are prepared, one in the presence of diethyl xanthogen disulfide and the other in the presence of technical dodecyl mercaptan.

The recipes used in preparing the polymers is shown below, amounts of ingredients being in parts by weight unless otherwise stated.

|  | Sol | | Gel | |
| --- | --- | --- | --- | --- |
|  | IS | IIS | IG | IIG |
| Chloroprene | 100 | 100 | 100 | 100 |
| Ethylene dimethacrylate | 0 | 0 | 3 | 3 |
| Disproportionated rosin [1] | 3 | 3 | 3 | 3 |
| Diethyl xanthogen disulfide | 0.525 | 0 | 0.45 | 0 |
| Dodecyl mercaptan | 0 | 0.267 | 0 | 0.23 |
| Water | 89.3 | 89.3 | 108.5 | 108.5 |
| Sodium hydroxide | 0.533 | 0.533 | 0.615 | 0.615 |
| Sodium salt of condensate of formaldehyde and naphthalenesulfonic acid [2] | 0.391 | 0.391 | 0.7 | 0.7 |
| Sodium 2-anthraquinonesulfonate | 0 | 0 | 0.007 | 0.007 |
| Monomer conversion | 69.3 | 69.2 | 95.9 | 95.2 |
| Catalyst used, ml.: |  |  |  |  |
| A | 4.8 | 1.8 | 3.0 | 3.1 |
| B | 0.2 | None | 1.7 | 1.4 |
| Final specific gravity | 1.062 | 1.062 | [3]1.085 | [3]1.085 |
| Mooney viscosity (ML 1+4, 100° C.) | 32 | 31 | 97 | 99 |

[1] Resin 731-SA, Hercules, Inc. The disproportionated rosin has been partially neutralized with sodium carbonate so that it has an acid number of about 140.
[2] "Lomar" PW, Nopco Chemical Co.
[3] (45° C.).

The two catalyst solutions are prepared as follows.

Catalyst A:                                            Parts
 Water _____ 1000
 Potassium persulfate _____ 1.5
 Sodium 2-anthraquinone-sulfonate _____ 0.075
Catalyst B:
 Water _____ 475
 Potassium persulfate _____ 25

The polymerization is carried out at 40° C. During the preparation of the gel polymers a temperature of 45° C. is used for the last hour of the polymerization.

Polymerization is initiated and maintained by adding Catalyst A in small increments. When polymerization becomes sluggish addition of Catalyst B is begun. The course of the polymerization is followed by measuring the specific gravity of samples of the latex. The polymerization is carried out in an inert atmosphere of nitrogen.

When the desired monomer conversion is reached, polymerization is stopped by adding about 0.01 part each of phenothiazine and 4-tert-butylpyrocatechol and 0.3–0.4 part of 2,6-di-tert-butyl-p-phenylphenol (per 100 parts of monomer).

The latexes are stripped of unreacted monomer by turbannular steam stripping, essentially as described in U.S. Pat. 2,467,769.

Blends containing 55 parts of the sol polymer and 45 parts of the gel polymers are prepared by mixing required amounts of the two latexes. The latex mixture is acidified to a pH of 5.7 with a 10% solution of acetic acid containing 2% of the sodium salt of the formaldehyde-naphthalenesulfonic acid condensate and isolated by freeze rolling. Samples of the unblended polymers are obtained by treatment of the unblended latexes in the same way for determination of Mooney viscosity of the polymer.

(B) Compounding, curing, and testing for tensile strength (1) Samples of the isolated polymer blends are compounded using the following recipe:

Parts by wt.
Polymer blend _____ 100
Stearic acid _____ 0.5
N-phenyl-1-naphthylamine _____ 2
Magnesia _____ 4
Semi-reinforcing furnace black _____ 85
Aromatic process oil ("Sundex" 790, Sun Oil Co.) __ 33
Zinc oxide _____ 5
Ethanolamine _____ 2
Di-o-tolylguanidine _____ 1.5

Samples are cured for 20 minutes at 153° C. and the tensile strength is measured at 25° C. by ASTM Method D 412-64 T using an Instron tensile tester. Table I shows the results (an average of two determinations is shown).

TABLE I

|  | A | B | C* | D* |
| --- | --- | --- | --- | --- |
| Sol polymer | IS | IS | IIS | IIS |
| Gel polymer | IG | IIG | IG | IIG |
| Tensile strength at break, p.s.i. | 2,500 | 2,475 | 1,825 | 1,760 |

*Comparison using mercaptan-modified sol polymer.

The above table shows that when a xanthogen-modified sol polychloroprene is used, the tensile strength is significantly higher than when a mercaptan-modified polychloroprene is used.

(2) Samples of two of the isolated polymers are compounded using the following recipe:

Parts by wt.
Polymer blend _____ 100
Stearic acid _____ 0.5
Antioxidant _____ 2
 (Mixture of 65% N-phenyl-2-naphthylamine and
 35% N,N'-diphenyl-p-phenylenediamine).
Magnesia _____ 4
Semi-reinforcing furnace black _____ 58
Aromatic process oil (same as in B–1 above) _____ 10
Zinc oxide _____ 5
1,4-diazabicyclo[2.2.2]octane (triethylenediamine) _ 2

The compounded elastomers are cured and tested as in B–1 above. Table II shows the tensile strengths (average of two determinations).

TABLE II

|  | A | B* |
| --- | --- | --- |
| Sol polymer | IS | IIS |
| Gel polymer | IG | IIG |
| Tensile strength at break, p.s.i. | 3,150 | 1,550 |

*Comparison using mercaptan-modified sol polymer.

(3) Samples of two of the isolated polymers are compounded as in B–1 above except that 0.75 part of 2-mercapto-2-imidazoline is used as the vulcanization accelerator instead of ethanolamine and di-o-tolylguanidine.

Table III shows the results.

TABLE III

|  | A | B* |
| --- | --- | --- |
| Sol polymer | IS | IIS |
| Gel polymer | IG | IIG |
| Tensile strength at break, p.s.i. | 2,200 | 2,050 |

*Comparison using mercaptan modified sol polymer.

Even though 2-mercapto-2-imidazoline is not the preferred vulcanization accelerator to promote high-strength properties of the xanthogen-modified polymers, the tensile strength obtained is superior to that obtained when the sol component is mercaptan-modified.

EXAMPLE 2

The sol polymer is prepared by polymerizing chloroprene in the presence of diethyl xanthogen disulfide using the following recipe:

Parts
Chloroprene _____ 100
Disproportionated rosin (Hercules, Inc., Resin
 S–936) _____ 3
Diethyl xanthogen disulfide _____ 0.49
Water _____ 91.5
Sodium hydroxide (100%) _____ 0.55
Sodium salt of formaldehydenaphthalenesulfonic
 acid condensate _____ 0.40

The polymerization is carried out at about 40° C. to a monomer conversion of about 70%. The catalyst used is 4 parts of a solution containing 0.006 part of potassium persulfate and 0.0003 part of sodium 2-anthraquinonesulfonate. Polymerization is stopped in the same way as in Example 1.

The gel polymer is prepared using the following recipe:

| | Parts |
|---|---|
| Chloroprene | 97 |
| Ethylene dimethacrylate | 3 |
| Disproportionated rosin (same as in sol polymer) | 3 |
| Diethyl xanthogen disulfide | 0.4 |
| Water | 108.5 |
| Sodium hydroxide | 0.67 |
| Sodium salt of formaldehydenaphthalenesulfonic acid condensate | 0.7 |
| Sodium 2-anthraquinonesulfonate | 0.007 |

Polymerization is carried out at 40 to 45° C. to a final conversion of about 95%, using a potassium persulfate catalyst.

The two latexes are mxed in a proportion to give 75 parts of sol polymer and 25 parts of gel polymer. Unreacted monomer is removed by turbannular steam stripping and polymer is isolated by freeze-rolling.

A sample of the isolated mixture is compounded, cured, and tested as in B-2 above, except that the magnesia level is reduced from 4 parts to 1 part. The vulcanizate has a tensile strength of 3375 p.s.i.

What is claimed is:

1. A polychloroprene sol-gel blend elastomer composition comprising an intimate mixture of (a) a benzene-soluble polymer prepared by polymerizing chloroprene to a monomer conversion at which benzene-soluble polymer is obtained in an aqueous emulsion containing the chloroprene and a dialkyl xanthogen disulfide, said disulfide being present in an amount equivalent to about from 0.15 to 1 part of diethyl xanthogen disulfide per 100 parts of chloroprene monomer, the alkyl group having from 1 to 8 carbon atoms, and (b) a benzene-insoluble polymer of chloroprene directly prepared by having present in the polymerization system a monomer which contains two or more polymerizable double bonds and will copolymerize with the chloroprene, in which mixture the proportion by weight of (a) to (b) ranges from 20:1 to 1:1.

2. A composition of claim 1 in which the dialkyl xanthogen disulfide is diethyl xanthogen disulfide.

3. A composition of claim 1 in which the benzene-insoluble polymer (b) is a copolymer of chloroprene and ethylene dimethacrylate.

4. A composition of claim 1 in which the proportion by weight of (a) to (b) is about 55:45.

5. A composition of claim 1 in which the proportion by weight of (a) to (b) is about 75:25.

6. In a process for producing polychloroprene sol-gel blend compositions curable to elastomeric products having improved tensile strength the steps comprising (1) preparing a benzene-soluble polymer of chloroprene by polymerizing chloroprene to a monomer conversion at which benzene-soluble polymer is obtained in an aqueous emulsion containing the chloroprene and a dialkyl xanthogen disulfide, the amount of the latter being equivalent to about from 0.15 to 1 part of diethyl xanthogen disulfide per 100 parts of chloroprene monomer, and the alkyl group having from 1 to 8 carbon atoms, and (2) intimately mixing the polymer so prepared with a benzene-insoluble polymer directly prepared by having present in the polymerization system a monomer which contains two or more polymerizable double bonds and will copolymerize with the chloroprene, in the proportion by weight of 1 to 20 parts of benzene-soluble polymer per part of benzene-insoluble polymer.

References Cited

UNITED STATES PATENTS

| | | | |
|---|---|---|---|
| 2,321,693 | 6/1943 | Meisenburg et al. | 260—92.7 |
| 2,567,117 | 9/1951 | Mochel | 260—92.3 |
| 3,147,317 | 9/1964 | Jungk et al. | 260—890 |
| 3,147,318 | 9/1964 | Jungk | 260—890 |
| 3,444,152 | 5/1969 | Gintz et al. | 260—92.3 |

MURRAY TILLMAN, Primary Examiner

J. SEIBERT, Assistant Examiner

U.S. Cl. X.R.

260—79.5 C, 892, 893, 894